United States Patent

Gersch

[15] 3,689,169
[45] Sept. 5, 1972

[54] ADJUSTABLE TOOL BLOCK ASSEMBLY

[72] Inventor: Richard C. Gersch, 27401 Red Leaf Lane, Southfield, Mich. 48075

[22] Filed: Aug. 28, 1970

[21] Appl. No.: 67,856

[52] U.S. Cl. ................................................408/150
[51] Int. Cl. ...........................................B23b 29/034
[58] Field of Search..............408/150, 151, 180, 187

[56] References Cited

UNITED STATES PATENTS

| | | | |
|---|---|---|---|
| 2,211,321 | 8/1940 | Eipper | 408/151 |
| 3,323,393 | 6/1967 | Soykan | 408/180 |
| 3,208,445 | 9/1965 | Briney | 408/151 |

Primary Examiner—Gerald A. Dost
Attorney—Hauke, Gifford and Patalidis

[57] ABSTRACT

A tool assembly for a boring, turning, facing machine or the like in which a tool holding bar is pivotally supported upon a supporting bar for radial adjustment relative to a work surface. The tool holding bar is supported for radial movement on the supporting bar by means of an eccentric rotatable sleeve disposed in an aperture formed in the holding bar around a bushing secured to the supporting bar. The sleeve is actuated for adjustment of the cutting tool with respect to the workpiece by a hydraulic cylinder operating a gear arrangement through a sprag clutch to rotate the sleeve. When the eccentric sleeve is rotated, the cutting tool is adjusted toward the workpiece to compensate for wear of the tool.

14 Claims, 2 Drawing Figures

PATENTED SEP 5 1972

3,689,169

INVENTOR
RICHARD C GERSCH

BY *Anuka, Gifford & Patalidis*

ATTORNEYS

ADJUSTABLE TOOL BLOCK ASSEMBLY

BACKGROUND OF THE INVENTION

1. Field of the Invention

The invention relates generally to tool blocks and more particularly to such a tool block which is pivotally mounted upon a supporting bar and which is adjustable to compensate for wear of the cutting tool carried by the tool block.

2. Description of the Prior Art

Tool block assemblies, especially boring bar tool block assemblies, which provide adjustment for wear by pivoting the boring bar around an eccentric axis are known in the art. Heretofore, such assemblies have generally included complex electrical or mechanical arrangements to provide the means for adjusting the tool into the workpiece.

SUMMARY OF THE INVENTION

The present invention provides an adjustable tool block assembly for boring, turning, facing machines or the like utilizing a relatively simple and economical means for accomplishing adjustment of the position of the cutting tool to compensate for tool wear. The improved structure includes a supporting bar which supports on an upwardly extending bushing a rotatable sleeve having eccentric inner and outer diameters. A tool holding bar is pivotally mounted on the top of the supporting bar by means of a pin and has an aperture formed therein for receiving the eccentric sleeve, such that as the eccentric sleeve is rotated the tool holding bar is pivoted about the pin, radially displacing a tool held at the end of the tool holding bar. The eccentric sleeve is rotated by a hydraulic cylinder and gear arrangement through a sprag clutch so as to pivot the tool holding bar about the pin and advance the tool into the working surface to compensate for wear of the cutting tool.

BRIEF DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
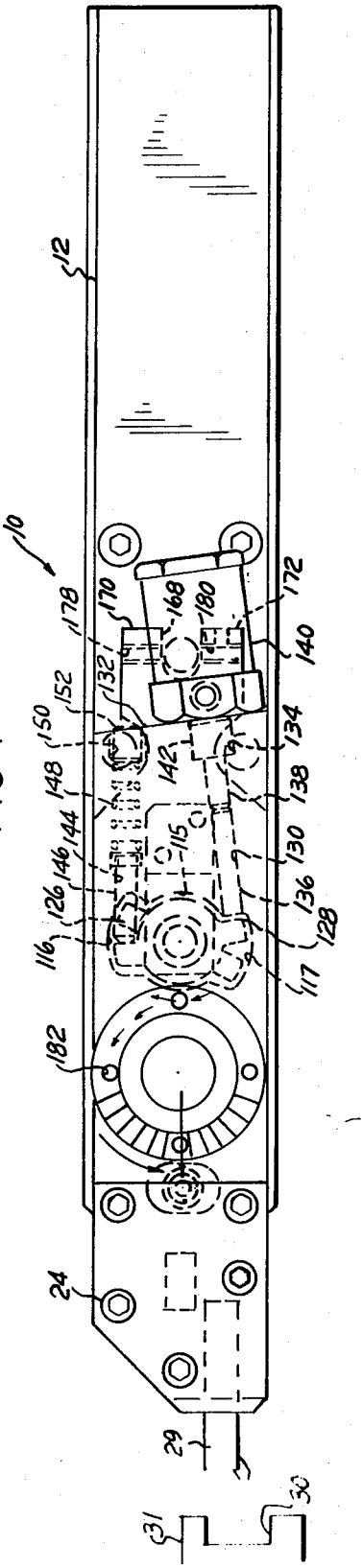
FIG. 1 is a top view of the preferred embodiment of the present invention.

With reference to the drawings, preferred tool block assembly is illustrated at 10 as including a supporting bar 12 which, although shown in the drawings as being of rectangular cross-section, may be of any other desired cross-section, such as round, polygonal or the like.

The bar 12 is provided with bolts and nuts 14, 15 and 16 at spaced points along its length for securing the bar to the machine (not shown). A bracket assembly 18 secured to the bottom of the bar 12 is also provided for securing the bar 12 to the machine. A tool holding bar 20 is pivotally mounted on the top surface of the bar 12 and has a tool holding plate 21 secured onto its outer end 22 by means of screws 24. As can best be seen in FIG. 2 the plate 21 preferably extends beyond the outer end 23 of the supporting bar 12. The bar 20 and plate 21 have registering slots 25 and 26, respectively, formed therein for receiving a key 27 to maintain alignment therebetween. A bore 28 extends inwardly from the outer end of the plate 21 for receiving a cutting tool 29, (FIG. 1) in a position to engage a working surface 30 of the workpiece 31 when the workpiece 31 is moved into the work position.

Figure 2:
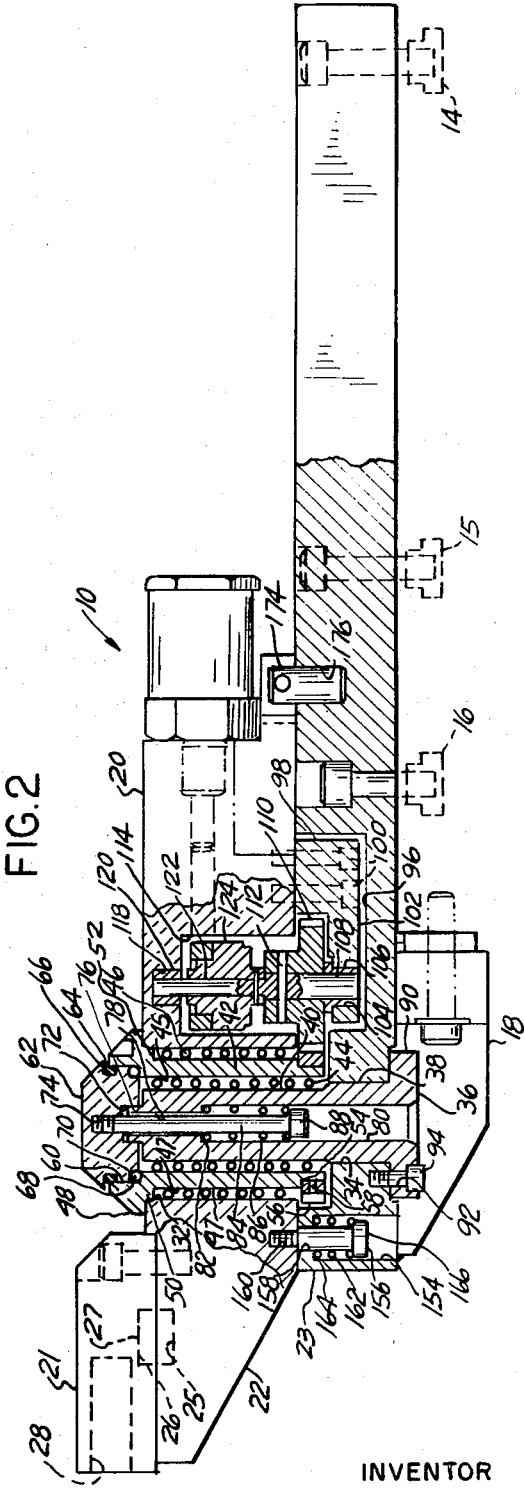
FIG. 2 is a longitudinal partial cross-sectional view through the preferred embodiment of the present invention illustrated in FIG. 1.

Referring to FIG. 2 the bar 20 includes a vertically disposed cylindrical aperture 32 formed therein adjacent the outer end 22 and with its axis perpendicular to the axis of elongation of the bar 20. A vertically disposed cylindrical aperture 34 is formed in the bar 12 with its axis lying along an axis coinciding with the axis of the aperture 32. The aperture 34 receives a tubular bushing 36 therein which includes a cylindrical portion 38 disposed within the aperture 34 and having substantially the same diameter as the aperture. The bushing includes a second cylindrical portion 40 of smaller diameter than the portion 38 and extending upwardly therefrom into the aperture 32. A tubular, eccentric sleeve 42 is received within the aperture 32 around the portion 40 for rotation thereon by means of an anti-friction ball bushing 44 disposed between inner cylindrical surface 45 of the sleeve 42 and the portion 40. The rotatable sleeve 42, in turn, has an an anti-friction ball bushing 46 disposed therearound between the outer cylindrical surface 47 of the sleeve 42 and the aperture 32. Thus, the tubular sleeve is rotatable within the ball bushing 44 and 46 relative to the tool bars 12 and 20. The inner surface 45 rotates about the axis of the aperture 32, whereas the outer surface 47 rotates about an axis offset from but parallel to the axis of the aperture 32.

The rotatable sleeve 42 is provided with an outwardly extending flange 48 formed at its outer end, which, on its inner side is provided with a tapered surface 50 for matching engagement with a tapered locating surface 52 provided at the outer end of the aperture 32. The inner end of the sleeve 42 has a smaller diameter as at 54 for receiving a gear 56 mounted thereon for remote rotation of the sleeve 42. The gear 56 includes a plurality of radially extending apertures 58 formed therein for receiving screws to secure the gear onto the inner end of the sleeve 42. Thus, the bushing 46 is retained between the aperture 32 and the sleeve 42 by the flange 48 and the upper surface of the gear 56.

The upper end of the sleeve 42 is provided with a countersunk aperture 60 for receiving a cylindrical cap 62 therein. The cap 62 includes an annular groove 64 formed therearound and has a resilient O-ring 66 disposed therein for forming a sealing contact with the aperture 60, preventing dirt and other harmful particles from entering the aperture 32. An annular groove 68 is formed on the lower end of the cap 62 for receiving a plurality of ball bearings 70 therein for forming a bearing surface between the cap 62 and the sleeve 42. The cap 62 includes a countersunk bore 72 extending upwardly from its lower surface and has a threaded aperture 74 extending upwardly therefrom. The bore 72 receives an upwardly extending annular flange 76 formed on the upper surface of the bushing 36 around an aperture 78 extending a portion of the way through the bushing 36. The aperture 78 expands into a larger diameter aperture 80 which extends the remaining way through the bushing 36 along the axis of elongation of the bushing and has a shoulder 82 disposed therebetween. A bolt 84 is disposed in the aperture 80 and extends upwardly through the aperture 78 with its threaded end engaged in the threaded aperture 74. A spring 86 is disposed around the bolt 84 and is compressed between the shoulder 82 in the head 88 of the bolt, pulling the cap 62 towards the bushing 36. A flange 90 extends outwardly from the lower end of the bushing 36 and has a plurality of apertures 92 formed therein for receiving bolts 94, which fixedly secure the bushing 36 to the bar 12. Thus, the spring 86 and the bolt 84 bias the cap 62 towards the aperture 32, holding the sleeve 42 and the bushings 44 and 46 within the aperture 32. The flange 48, in turn, holds the bar 20 on the bar 12.

Still referring to FIG. 2 the bar 12 includes a chamber 96 formed in its upper surface immediately rearward of the aperture 34 for receiving a supporting plate 98, which is secured to the lower surface of the bar 20 by means of bolts 100. The plate 98 has a forwardly extending flange 102 extending from its lower end with an aperture 104 formed adjacent its end. A bushing 106 is disposed within the aperture 104 and receives one end of a pivotally mounted shaft 108. A gear 110 is disposed around the shaft 108 within the chamber 96 and engages the gear 56. The gear 110 is fixedly secured to the shaft 108 by means of a pin 112. The upper portion of the gear 110 and the shaft 108 extend into a bore 114 formed in the lower surface of the bar 20. The bore 114 includes a cylindrical central portion 115 and a pair of opposed cut-out portions 116 and 117 (FIG. 1) extending upwardly along opposite sides thereof. A smaller diameter cylindrical bore 118 extends upwardly from the upper surface of the portion 115 and receives a bushing 120 therein. A shaft 122 has one end pivotally mounted within the bushing 120 and extends downwardly therefrom into the bore 114 with its other end exposed immediately adjacent the upper end of the shaft 108. A one-way clutch 124 is disposed within the portion 115 around the shaft 122 and includes a pair of outwardly extending tabs 126 and 128 formed at its upper end and extending into the cut-out portions 116 and 117, respectively. The clutch 124 is of a conventional construction and is preferably of the sprag type but of course can be of any type which will hold the gear 110 in the rotated position as will become more apparent as the description proceeds.

The clutch 124 engages the shaft 108 and the gear 110 such that rotation of the clutch 124 in the clockwise direction, as viewed in FIG. 1, rotates the gear 110 and the shaft 108 in the clockwise direction, whereas rotation of the clutch 124 in the counterclockwise direction does not rotate the shaft 108 and the gear 110 due to the disengagement of the one-way clutch.

As can best be seen in FIG. 1 the bar 20 includes a cylindrical bore 130 which intersects the portion 117 adjacent to tab 128 end extends rearwardly therefrom to the rear vertical surface 132 of the bar 20. A counter bore 134 extends inwardly from the rear surface 132. A pin 136 is disposed within the bore 130 with one end engaging the tab 128 and the other end engaged by a push rod 138, which extends outwardly from a hydraulic cylinder 140 secured to the surface 132. The push rod 138 includes a larger diameter portion 142 disposed within the counter bore 134. Thus, as a hydraulic cylinder 140 pushes the rod 138 into the bore 130, the pin 136 is pushed into the portion 117 against the tab 128, rotating the clutch 124 in a clockwise direction, causing the gear 110 to rotate in the clockwise direction. A second cylindrical bore 144 is formed in the bar 20 and intersects the portion 116 adjacent to the tab 126 and extends rearwardly therefrom to the rear surface 132. A pin 146 is disposed in the bore 144 and has one end engaged with the tab 126 and the other end engaged with a spring 148 disposed in the rear portion of the bore 144. A threaded countersunk hole 150 extends inwardly from the surface 132 into the bore 144 for receiving a threaded plug 152 for maintaining the spring 148 therein. Thus, as the clutch 124 is rotated clockwise by the hydraulic cylinder 140, the pin 146 is pushed rearward into the bore 144, compressing the spring 148. When the pressure is relieved in the cylinder 140, the spring 148 pushes the pin 146 against the tab 126, rotating the clutch 124 counterclockwise, pushing the pin 136 back into the bore 130. The gear 110 remains in position as the clutch 124 and the hydraulic cylinder return to the initial position.

The bar 20 is held onto the top surface of the bar 12 by the flange 48 and the spring biased bolt 84 as hereinbefore described. A vertically disposed elongated aperture 154 is formed in the bar 12 adjacent the end 23 for receiving a bolt 156 therein. The bolt 156 extends through a smaller diameter elongated aperture 158 formed at the upper end of the aperture 154 with its upper end threaded into a threaded aperture 160 formed in the bar 12. A spring 162, disposed in the aperture 154, is compressed between the radially extending surface 164 formed between the apertures 154 and 158 and the bolt head 166, biasing the bar 20 toward the bar 12 to hold it thereon.

The rear end of the bar 12 is shaped to form a yoke providing a central recess 168 between opposite arms 170 and 172. The recess 168 is adapted to receive the outer end of a dowel 174, which is secured in the bar 12 by extending into an aperture 176 formed therein. The yoke arms 170 and 172 are provided with transverse threaded apertures 178 and 180, which are centrally aligned in relation to the axis of the dowel 174 and which are adapted to each adjustably receive a set screw for adjustable abutment against the radial surface of the dowel 174. Thus, the bar 20 is pivotally mounted by means of the dowel 174 onto the top surface of the bar 12. As the bar is rotated about the dowel 174, the tool 29 is moved into or away from the working surface 30 of the workpiece 31. It will be noted that due to the elongation of the apertures 154 and 158, the bolt 156 does not prevent the bar 20 from rotating about the dowel 174.

To obtain axial adjustment of the cutting tool 29, the nuts and bolts 14, 15 and 16 and the bracket assembly 18 are loosened and the bar 12 is then moved either toward or away from the workpiece 31. To obtain radial adjustment of the tool 29, due to the tool wear or the like, the hydraulic cylinder 140 is actuated, pushing the pin 136 further into the cut-out portion 117, rotating the one-way clutch 124 clockwise through the tab 128. The clockwise rotation of the clutch 124 rotates the gear 110 in the clockwise direction, which, in turn, rotates the eccentric sleeve 42 in the counterclockwise direction about the bushing 36. As previously discussed, the inner cylindrical surface 45 of the sleeve 42 rotates about one axis, whereas the outer cylindrical surface 47 of the sleeve 42 rotates about a parallel but offset axis. Thus, as the sleeve 42 is rotated, the outer surface 47 through the bearing 46 rotates the bar 20 about the dowel 174, radially advancing the tool 29 into the working surface 30. Once the tool 29 has been advanced into the working surface 30, the cylinder 140 can be exhausted and the pin 136 will be returned by the spring 148, rotating the one-way clutch 124 counter-clockwise. It will be noted that the counter-clockwise rotation of the clutch 124 does not rotate the gear 110. When the tool 29 again wears, the cylinder 140 is pressurized to advance the tool into the working surface. Since each stroke of the cylinder 140 produces the same incremental change in the position of the tool there is little chance of moving the tool too far into the workpiece.

The cylinder 140 may be actuated by any convenient means, such as by a solenoid actuated valve actuated by the machine operator. Alternatively, the work surface 30 in the workpiece 31 can be constantly checked by a conventional gaging apparatus (not shown) to determine if the surface is within the specified manufacturing tolerances. The gaging apparatus may be connected to a conventional actuating unit to actuate the cylinder 140 when the surface is not within the tolerances.

When it is desired to retract the cutting tool 29 from the working surface 30, a special tool having studs thereon is inserted into the apertures 182 formed in the flange 48 and the sleeve 42 is manually rotated in a clockwise direction.

Although I have described but one preferred embodiment of my invention, it is to be understood that various changes and revisions can be made therein without departing from the spirit of the invention or the scope of the appended claims.

I claim:
1. An adjustable tool holder, comprising:
a first bar;
a second bar pivotally mounted on said first bar and having means for securing a cutting tool to its outer end, said second bar having a cylindrical aperture formed therein with its axis of elongation substantially perpendicular to the axis of elongation of said second bar;
a cylindrical bushing secured to said first bar and extending into said aperture;
an eccentric sleeve positioned for rotation within said aperture around said bushing;
a first bearing disposed between said bushing and said sleeve;
a second bearing disposed between said sleeve and said aperture;
pressure operated means mounted on said bars for selective rotation of said eccentric sleeve in one direction for pivoting said second bar with respect to said first bar.

2. The tool holder as defined in claim 1 and including a first gear secured around said sleeve;
a second rotatably mounted gear engaged with said first gear to rotate said sleeve; and
a one-way clutch operatively connected to said pressure operated means for rotation thereby, said clutch being engaged with said second gear and operative to rotate said second gear in one direction when said clutch is rotated by said pressure operated means.

3. The tool holder as defined in claim 2, wherein said clutch is spring loaded for rotation in the direction opposite from the direction said clutch is rotated by said pressure operated means.

4. The tool holder as defined in claim 3, wherein said clutch includes
a pair of opposed radially extending tabs formed thereon;
said pressure operated means including an outwardly extending shaft operatively engaged with one of said tabs to rotate said clutch; and
a spring engaging the other tab biasing the clutch against the rotation of said pressure operated means.

5. The tool holder as defined in claim 4, wherein said second bar has a bore formed therein with its axis of elongation substantially perpendicular to the axis of elongation of said second bar, said bore being disposed immediately rearward of said aperture and having said clutch rotatably mounted therein.

6. The tool holder as defined in claim m 5, and including a second and third aperture formed in said second bar and extending from said bore to the rear surface of said second bar, said shaft from said pressure operated means being disposed in said second aperture and said spring being disposed in said third aperture.

7. The tool holder as defined in claim 1, wherein said pressure operated means includes a hydraulic cylinder.

8. The tool holder as defined in claim 1, and including a pin secured to said second bar and pivotally mounted in an aperture formed in said first bar.

9. The tool holder as defined in claim 1, wherein said bushing includes
an aperture formed therethrough along the axis of elongation of said bushing;
said sleeve includes a counterbore formed at its upper end along the axis of elongation of said sleeve;
a cylindrical cap disposed within said counterbore; and
a spring loaded bolt disposed within the aperture formed in said bushing and having one end secured to said cap to bias said cap toward said bushing.

10. The tool holder as defined in claim 9, wherein said sleeve includes a radially extending flange formed at its upper end which engages the upper surface of said second bar.

11. An adjustable tool holder comprising:
a first bar;
a second bar and means pivotally mounting said second bar to said first bar;
means for securing a cutting tool to one end of said second bar, and
means for selectively pivoting said second bar about said mounting means to thereby adjust the position of said cutting tool,
said pivoting means comprising an extension formed on said first bar intermediate said cutting tool and said mounting means, an eccentric bushing carried by said second bar and received by said extension and means for selectively rotating said bushing and said rotating means comprising a fluid pressure operated device and means connecting said fluid pressure operated device to said bushing.

12. The tool holder as defined in claim 11 and in which said last mentioned means comprises a gear carried by said bushing, a gear member meshing with said gear and means connecting said fluid pressure operated device to said gear to produce rotation of said gear upon actuation of said fluid pressure operated device.

13. The tool holder as defined in claim 12 and in which said last mentioned means includes a one way clutch connected between said gear and said fluid pressure operated device.

14. An adjustable tool holder comprising:
a first bar;
a second bar and means pivotally mounting said second bar to said first bar;
means for securing a cutting tool to one end of said second bar;
means for selectively pivotting said second bar about said mounting means to thereby adjust the position of said cutting tool;
said pivotting means including an eccentric bushing carried by said second bar, a gear member connected with said eccentric bushing for rotating same, and means operable to rotate said gear member through a predetermined increment each time said rotating means is actuated.

* * * * *